April 29, 1958

I. M. NEITLICH 2,832,119

SLIDE FASTENER STOPS

Filed Sept. 30, 1953

INVENTOR.
IRVING M. NEITLICH

BY his ATTORNEYS.

April 29, 1958     I. M. NEITLICH     2,832,119
SLIDE FASTENER STOPS

Filed Sept. 30, 1953     2 Sheets-Sheet 2

INVENTOR.
IRVING M. NEITLICH
BY
his ATTORNEYS

# 2,832,119

SLIDE FASTENER STOPS

Irving M. Neitlich, Stamford, Conn., assignor, by mesne assignments, to Cue Fastener, Inc., a corporation of New York Application September 30, 1953, Serial No. 383,286

7 Claims. (Cl. 24—205.11)

This invention relates to improvements in slide fasteners and methods of making the same and, more particularly, to improved stops for the stringers of slide fasteners and to methods of making and applying such stops to the stringers.

The term "stops" used herein refers to elements which are applied to the fastening elements or their components of slide fasteners to keep the slider used for joining and disconnecting the fastening elements from running off of the ends of the rows of fastening elements.

Currently, there are many different types of stops in use, each of which serves a specific purpose. Closed bottom stops are found on the "regular" type of slide fasteners and serve to hold and position the two sides of the fastener together at one end as well as to restrict the movement of the slider beyond a predetermined point on the fastener.

Open top stops are found on the regular and separating slide fasteners. The open top stops enable the portion of the slide fastener above the slider to remain open but prevent the slider from running off the ends of the fasteners.

The third general type of stop is the bridge top stop which is found mainly on slide fasteners used for dress plackets and the like. The bridge top stops preposition the fastener at its upper portion and prevent it from being opened completely.

Usually, the various types of stops referred to above and made by the various manufacturers are small metallic clip elements which may be folded around the stringers or parts thereof and clinched through the supporting tape or fabric to provide an abutment against which the slider of the fastener will engage to keep it from running off the end of the fastener. One form of these stops resembles a staple having a flattened mid-portion and angularly related points which are forced through the fabric at the adjacent ends of the two rows of fasteners and clinched on the opposite side of the fabric to hold the fastener elements together in proper alignment.

The open top stops may be similar U-shaped elements which are clinched around the beaded edge and tape in order to form abutments and thus prevent the slider from running off of the fastener elements.

The bridge top stop may be similar to the bottom stop and may be attached in the same general way. All of these stops have certain disadvantages from a manufacturing as well as from a consumer standpoint.

The fold-over or staple types of stops have to be preformed by stamping or other suitable means and then attached to the stringer in a separate operation.

Inasmuch as the stringers are often made in different colors, it is necessary to enamel or otherwise color the stops to match the fastener before assembly or after they have been assembled with the slide fastener. Each method produces some difficulties because not all colors of fasteners are on constant order by the customers and, as a consequence, segregation of the various colors is necessary in either case and a storage problem is created.

In addition to the difficulty of suitably coloring and applying the stops to every stringer, there is always the problem of inspection which is particularly difficult because of the small size of the stops. The manufacturer has to make sure that when the stops are folded over they do not crack and disengage and that they encompass enough of the fabric or beads of the stringer to anchor them securely. Moreover, the inspection must detect whether the elements are marred, unsightly or chipped and discard the unsatisfactory products in order to produce a saleable and satisfactory article. The manufacturer also has to make sure that the stops are bent over and the ends are clinched properly as otherwise they may injure the skin or the garments of the wearer.

All in all, the prior types of stops for slide fasteners leave something to be desired, and even when they satisfy all of the requirements outlined generally above, they sometimes can be damaged or partially disengaged by too violent operation of the fastener so that the slider becomes disengaged.

The present invention involves the production of stops which, while simple in design are functional and serve the purpose far better than the types of stops developed heretofore. Moreover, the new type of stop eleminates most if not all of the disadvantages found in the metal stops and the disadvantages which are present in prior stops made of plastic or other materials. In general, the new stop comprises a molded slug formed of a suitable plastic, such as, a thermoplastic resin, which is cast on between or adjacent the fastening elements of a fastener by a molding operation so that the slug or stop formed therefrom is securely anchored to the fastening elements or tape or both of the fastener so that dislodging or misalignment of the stop is substantially completely avoided.

The stops may be formed of any suitable thermoplastic resin or other plastic, such as, for example, "Nylon," or "Vinylite," which are used or have been used heretofore in the formation of slide fasteners of the plastic type.

In accordance with my invention, I can mold all of the prior classes of stops at high speed and with little danger of improper formation or alignment thereof. I have also found it possible, with my invention to impart to the stops numerous hues and shades heretofore impossible and impractible by conventional means.

Inasmuch as the stops can be molded or cast on the fastening elements, the stringers, including the rows of fasteners, can be manufactured continuously in a mass production operation and the stops thereafter applied as may be required to different lengths of the fastener material to produce slide fasteners of the desired sizes and characteristics. A particular advantage of the present type of stop is that it is formed of a relatively soft material so that when the slide fastener is being attached to a garment, contact of the needle with the stop will not necessarily break the needle as is usually the case when the needle strikes a metallic stop on a conventional fastener.

The new type of stop can be blended in with the remainder of the fastener so that it is inconspicuous while, nevertheless, being effective for the purpose for which it is designed.

The stringers and the stops can also be provided with molded portions which produce the effect of boning the slide fastener to give it stiffness where desired in order to stiffen garments or the like in which the fasteners are used. Moreover, the stops may be shaped and positioned to protect the fastening elements at either end of the stringer and prevent them from coming into contact with the wearer or the wearer's garments.

For a better understanding of the present invention, reference may be had to the accompanying drawing in which.

The present invention will be described with reference to the molding of stops of various types on a coil or spiral type of fastener in which the inter-engaging fastening elements are formed as continuous coils of a plastic, such as "nylon." The invention is, however, not limited to use with plastic spiral fasteners and, in fact, it is equally applicable to tooth or scoop types of fasteners having separate interlocking teeth formed of metal, plastics and the like.

Figure 1:
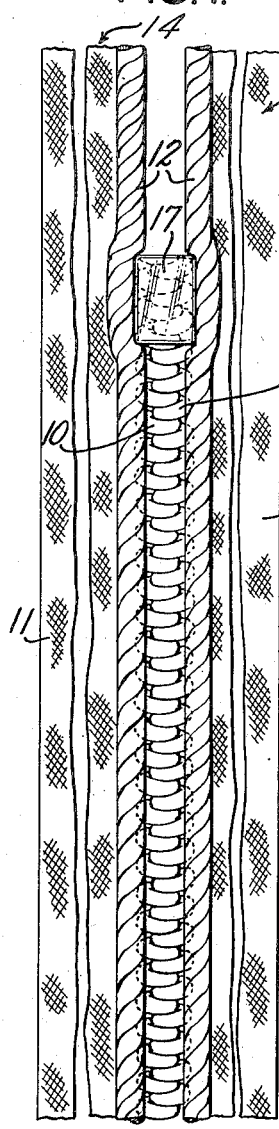
Fig. 1 is a plan view of a portion of a spiral slide fastener having a closed bottom stop thereon of the type embodying the present invention.
Figure 3:
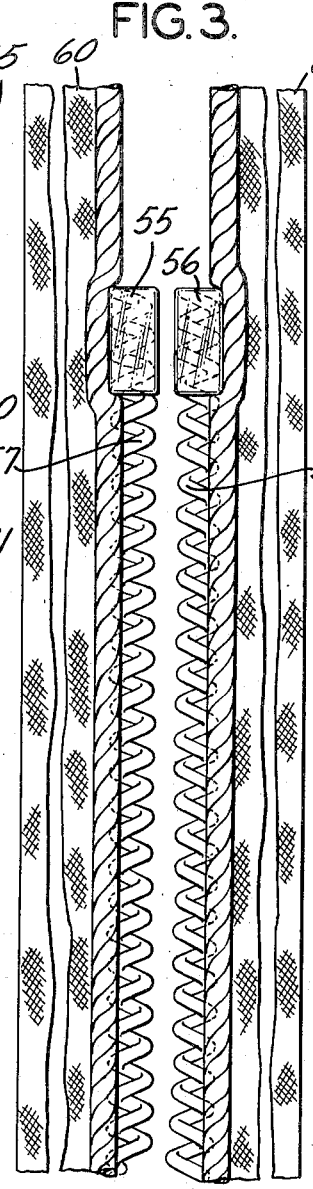
Fig. 3 is a plan view of a portion of a spiral slide fastener having a pair of open top stops thereon of the kind embodying the present invention.
Figure 2:
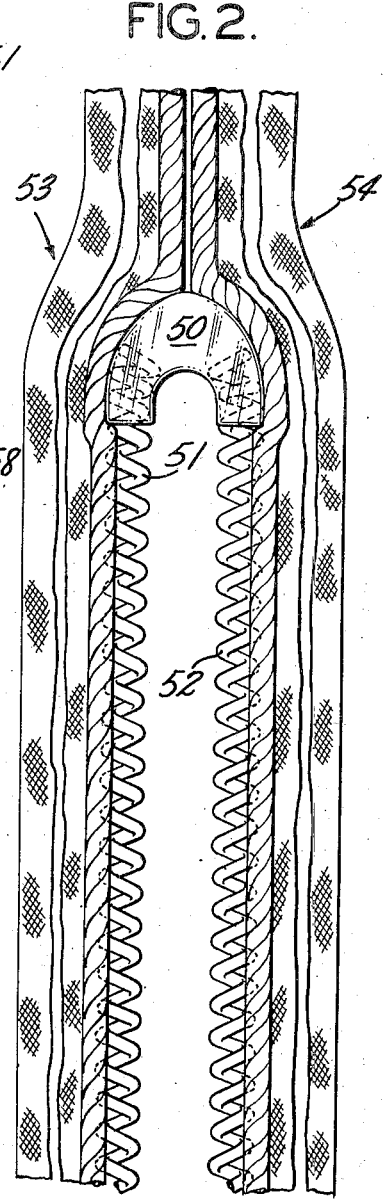
Fig. 2 is a plan view of a spiral slide fastener having a bridge type stop thereon of the kind embodying the present invention.

The fasteners disclosed in Figs. 1 to 3 of the drawing may be of the type generally shown in the Nicholas Wahl Patent No. 2,300,442 dated November 3, 1942. That is, each stringer includes a spiral or generally flattened helical coil 10 of a filament of oblong cross section which is secured to a tape 11 with provision for a bead 12 for guiding the slider for the fastener, as may be required.

As shown in Fig. 1, two of the stringers 14 and 15 making up a slide fastener, are joined at their bottom ends by means of a closed bottom stop 17. The closed bottom stop 17 consists of a slug of thermoplastic resin such as "nylon" which has been molded into and around the convolutions at the ends of the stringers and bonded thereto by cooling the molten resin. The molten resin is injected under pressure so that it penetrates into the tapes 11 and encloses the loops of the coils 10 and bonds them together into an essentially unitary structure so that they cannot be separated without damaging the tapes 11, 11 and the coils 10, 10.

Figure 4:
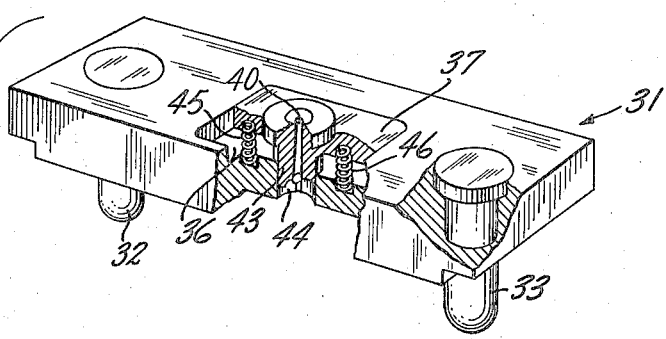
Fig. 4 is a perspective view of an open mold by means of which the stops can be molded on slide fasteners.
Figure 5:
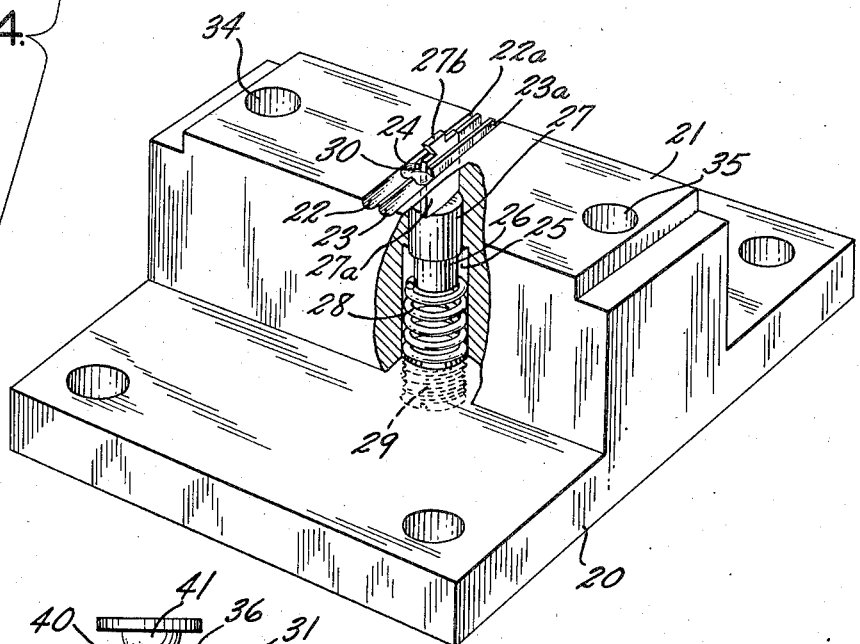
Fig. 5 is a view in cross section through the closed mold.
Figure 5:
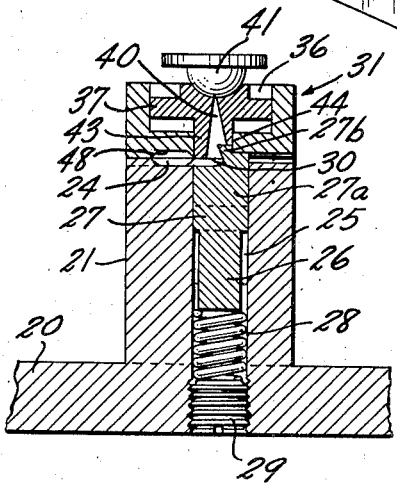

The manner in which such a bottom stop 17 is molded on the loops of the coils will be more apparent from consideration of the molding apparatus disclosed in Figs. 4 and 5 of the drawings. The molding apparatus includes a base plate 20 which is secured to the platen of an injection molding apparatus. The base plate 20 has an upstanding block 21 thereon. Extending about halfway across the upper surface of the block 21 are a pair of grooves 22 and 23 adapted to receive the ends of the coils 10, 10 and the beads 12, 12 of the stringers 14 and 15. Narrower grooves 22a and 23a extend from the inner ends of the grooves 22 and 23 to receive the beads 12, 12 extending along the tapes of the fastener. The tapes 11, 11 lie on top of the block 21 on opposite sides of the grooves. A mold recess 24 is formed at and joins the inner ends of the grooves 22 and 23 to receive the plastic to be molded around the ends of the coils 10, 10 as will be explained.

The flange 21 is provided with a vertical bore 25 in which is received a plunger 26 having an enlarged head portion 27 fitting in the bore and normally being urged upwardly by means of a spring 28 interposed between the lower end of the plunger and a plug 29 in the base plate 20. The upper end or head 27 of the plunger has an upwardly extending flange 27a on it which is provided with an inverted keystone shaped claw 27b, the claw and flange being thin and flat and extending through a slot 30 between the groove portions 22a and 23a.

The mold also includes an upper mold section 31 which is provided with a pair of dowel pins 32 and 33 engageable in holes 34 and 35 in the lower mold section to guide the sections into alignment. The mold section 31 has a recess 36 in its top to receive a plate 37 having a sprue passage 40 therein, through which the plastic material is introduced by means of an injection nozzle 41, as shown in Fig. 5. The sprue passage 40 is flared and extends through an extension member 43 which is slideable in a hole 44 in the bottom of the mold section 31. The plate 37 is normally urged upwardly by means of a pair of coil springs 45 and 46 interposed between the bottom of the recess 36 and the bottom of the plate 37. The undersurface of the mold section 31 is also provided with a mold cavity 48 to mold the top of the bottom stop to the shape desired.

In operation, the two stringers 14 and 15 of the slide fastener are pulled into the grooves 22 and 23 so that the ends of the coils 10, 10 are positioned in the mold recess 24. With the two stringers of the slide fastener in position, the upper mold half 31 is moved downwardly and the injection nozzle 41 is moved to engage the plate 37 and inject a charge of molten plastic through the sprue opening 40 into the mold cavity 24, 48. As the place 37 moves downwardly, the end of the tubular extension 43 engages the claw 27b and pushes the plunger 26 downwardly so that the plastic can flow into the mold cavity 24, 48 through the end of the slot 30, as shown in Fig. 5. After the plastic is injected into the mold cavity 24, 48, the nozzle 41 is raised and the springs 28, 45 and 46 raise the plate 37 and the plunger 26 upwardly. As a result, the edge of the flange 27a shears off the plastic at the inner edge of the mold recess 24, 48. When the upper mold section 31 is raised to open up the mold, the plastic in the sprue opening 40 will be engaged with the claw 27b and will be pulled out of the opening 40 and can be discharged from the claw 27b by an air blast or sweeper (not shown).

The mold cavity can be modified, of course, to accommodate different sizes and types of fastener elements and to mold different kinds of stops on the fasteners. For example, a horseshoe-shaped cavity may be provided in the mold so that an arcuate bridge stop 50 can be molded on the adjacent ends of the coils 51 and 52 of the two cooperating stringers 53 and 54.

Likewise, as shown in Fig. 3, separate open top stops can be formed by molding smaller shots or slugs 55 and 56 of plastic on the outer ends of the coils 57 and 58 to retain the slider thereon.

The slugs have about the same cross-sectional dimensions as the convolutions or loops of the coils 57 and 58 and fill in between the loops to form solid stops having the loops embedded in them. The plastic penetrates the tapes 60 and 61 on which the coils are fastened further strengthening the stops and holding them securely in position. If desired, the mold may be so arranged that the plastic is cast around and penetrates the beads as well as the tapes or fabric on which the fastener elements are mounted. By appropriately selecting the type of plastic material used for the formation of the stops, it is possible to form a purely mechanical bond between the stops and the slider elements. By selecting materials of suitable properties and using appropriate temperatures for melting the plastic material, it is possible to weld the stops to rows of plastic fastener elements.

The plastic or resin may be used with metal fasteners where only a mechanical bond is formed therebetween. However, the bond between the fasteners and the stops and the stop and the fabric is so strong that the stop can be displaced only by damaging the fastening elements. The stops can, of course, be modified to include functional or ornamental features such as decorative additions or buttons, hooks and the like for cooperation with button holes, eyes and the like on the same or different garment or article.

The use of stops formed of plastic with fasteners formed of plastic is most advantageous particularly when producing colored fasteners. The molding machine can be charged with the same kind of plastic as that from which the fastener elements or coils are formed so that the stops will exactly match the fastener elements when applied thereto. Moreover, a homogeneous stop is produced which cannot be dislodged and because of its relation to the fastener elements, in many cases, it will prevent misalignment of the fastener elements and thereby facilitate the closing of the fastener.

It will be understood that the shape or type of stop formed will be dependent largely on the kind of slider and the kind of fastening elements with which they are used and that variations may be made in the contour and arrangement of the stops as the purpose demands. Accordingly, the forms of stops disclosed herein should be considered as illustrative and not as limiting the scope of the following claims.

I claim:

1. In a slide fastener, a pair of stringers each including a strip of fabric having a coil of plastic material thereon, said coil having opposite loose ends and including a series of loops, each loop forming a fastening element, and a bottom stop for a slider joining the stringers at one loose end of the coils, said stop comprising a molded slug of plastic material having a plurality of the coils at said one loose end of each of said coils embedded in and fused to it and said slug being in intimate contact with and penetrating the fabric from opposite sides thereof adjacent to said one free ends of said coils.

2. The slide fastener set forth in claim 1 comprising beads adjacent each row of fastener elements for guiding said slider therealong, said stop having portions of said beads embedded in it.

3. In a slide fastener, a stringer including a strip of fabric having an elongated coil of plastic thereon having opposite loose ends, said coil including a series of loops, each loop being a fastening element, and a stop for a slide fastener adjacent to one loose end of said coil, said stop comprising a molded slug of plastic fused with and having a plurality of coils at said one loose end of the coil embedded in it and extending between them and united with the fabric between and adjacent to said plurality of loops.

4. The slide fastener set forth in claim 3 in which the slug is of only slightly greater cross-section than the cross-section of the coils embedded within it.

5. In a slide fastener, a pair of stringers each including a strip of fabric having an elongated coil thereon, said coil having opposite loose ends and including a plurality of loops, each loop being a fastener element, a closed bottom stop joining one loose end of one coil with the corresponding loose end of the other coil, and a bridge top stop joining the other loose ends of said coils, said bridge top stop comprising an arcuate molded slug of plastic material having embedded in its ends a plurality of loops of the other loose ends of said coils, said slug filling in between said plurality of loops and penetrating into said fabric adjacent to said plurality of loops.

6. The slide fastener set forth in claim 5 in which said closed bottom stop is a slug of plastic material having a plurality of loops at said one loose end of each coil embedded in it and penetrating into the fabric adjacent said one end of each coil.

7. In a slide fastener, a stringer including a piece of fabric having a continuous plastic fastener strip thereon, said strip being formed of a plurality of interconnected loops, each loop being a fastener element, said fastener strip having opposite ends disposed inwardly of the ends of said strips, a slider stop at one end of said fastener strip, said stop consisting of a molded slug of plastic having a plurality of said loops at one end of said row embedded in it, said slug completely surrounding, covering and filling in between and fused to said plurality of loops and having smooth uninterrupted outer surfaces and about the same cross-sectional dimensions as said loops, said slug engaging and penetrating the fabric adjacent to said plurality of loops.

References Cited in the file of this patent

UNITED STATES PATENTS

| | | |
|---|---|---|
| 2,045,504 | Waldes | June 23, 1936 |
| 2,174,160 | Marinsky | Sept. 26, 1939 |
| 2,220,136 | Marinsky | Nov. 5, 1940 |
| 2,441,007 | Carlile | May 4, 1948 |
| 2,483,703 | Legat | Oct. 4, 1949 |
| 2,497,821 | Kohler | Feb. 14, 1950 |
| 2,650,402 | Kuzmick | Sept. 1, 1953 |
| 2,701,401 | Dorman | Feb. 8, 1955 |